Patented Oct. 20, 1953

2,656,349

UNITED STATES PATENT OFFICE 2,656,349

14,15-OXIDES OF THE CYCLOPENTANOPOLY-HYDROPHENANTHRENE AND POLYHYDROCHRYSENE SERIES

Leopold Ruzicka and Placidus Plattner, Zurich, Switzerland, assignors to Ciba Pharmaceutical Products, Inc., Summit, N. J.

No Drawing. Original application November 26, 1946, Serial No. 712,258, now Patent No. 2,555,704, dated June 5, 1951. Divided and this application December 4, 1950, Serial No. 199,141. In Switzerland November 30, 1945

7 Claims. (Cl. 260—239.55)

This application is a division of our application Serial No. 712,258, filed November 26, 1946 (now U. S. Patent 2,555,704).

The present invention relates to new 14,15-oxides of the cyclopentanopolyhydrophenanthrene and polyhydrochrysene series.

The genins of strophanthus, digitalis and squill glucosides as well as the toad poisons are steroids which contain a hydroxyl group in the 14-position of the cyclopentanopolyhydrophenanthrene nucleus. Important physiological properties are attributed to this hydroxy group. However, synthethic methods of introducing a hydroxy group into the 14-position of the steroid nucleus are unknown at the present time.

In our parent application, 14-hydroxy-cyclopentanopolyhydrophenanthrene or polyhydrochrysene derivatives are produced by subjecting the respective $\Delta^{16,17}$-14,15-oxides to a reductive cleavage treatment with formation of a hydroxyl group.

The present invention relates to the above mentioned $\Delta^{16,17}$-unsaturated cyclopentanopolyhydrophenanthrene and polyhydrochrysene compounds which contain an oxido group in the 14,15-position and are otherwise substituted as desired. Particularly desirable are those compounds containing also in the 17-position a group having the desired steric relationship such as a free or esterified carboxyl, hydroxyacetyl, acyl or lactone group or other aliphatic, alicyclic, heterocyclic or aromatic residue which may be substituted in any desired manner, such as $\Delta^{16}$-3-acetoxy-14,15-oxido-etio-allocholenic acid methyl ester, $\Delta^{16}$-3,21-diacetoxy - 14,15 - oxido-20-keto-allo-pregnene, as well as analogous derivatives of the dimethylpolyhydrochrysene series (D-homosteroid series).

The new $\Delta^{16,17}$-14,15-oxides are obtained by oxidation of the corresponding 14,15; 16,17-unsaturated derivatives with peracids such as peracetic acid, perbenzoic acid and monoperphathalic acid, or by removing hydrogen halide from the halogenhydrins of the 14,15-unsaturated compounds.

The products of the invention are useful as intermediate products for the preparation of therapeutically useful compounds.

The invention is described more specifically in the following examples wherein the same relation exists between parts by weight and parts by volume as exists between grams and cubic centimeters.

Example 1

2 parts by weight of $\Delta^{14,16}$-3$\beta$-acetoxy-etio-allocholadienic acid methyl ester of the formula

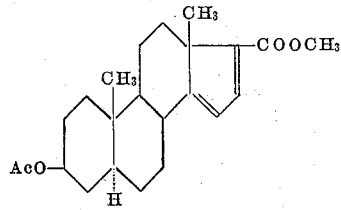

dissolved in 15 parts by volume of chloroform, are reacted with a solution of 1.25 parts by weight of perbenzoic acid in 20 parts by volume of chloroform and left for several hours at room temperature in darkness. Hereupon, with the addition of ice, the solution is diluted with 300 parts by volume of ether, washed with dilute sodium carbonate solution and water, dried and evaporated. The residue is dissolved in ether, filtered through aluminum oxide and the colorless oil obtained hereupon recrystallized from methanol. The $\Delta^{16}$-3$\beta$-acetoxy-14,15-oxido-etio-allo-cholenic acid methyl ester thus obtained melts at 115–117° C.

$\Delta^{14,16}$-3$\beta$-acetoxy - etio - allo - choladienic acid methyl ester is prepared as follows:

3.7 parts by weight of $\Delta^{16}$-3$\beta$-acetoxy-etio-allocholenic acid methyl ester are boiled under reflux for several minutes, and while being exposed to light, in 80 parts by volume of carbon tetrachloride with 2 parts by weight of bromosuccinimide. After cooling, filtration is effected, the solvent evaporated in vacuo from the filtrate and the oily residue thus obtained boiled in 20 parts by volume of pyridine, to which after 20 minutes, 5 parts by volume of acetic anhydride are added. After altogether a half hour, the solution is poured into water, the mixture extracted with ether, the ether extract washed with dilute hydrochloric acid, soda solution and water, dried with sodium sulfate, decolorized with animal charcoal and the ether evaporated. The solidified crude product is recrystallized from methanol. There is obtained thus in very good yield $\Delta^{14,16}$-3$\beta$-acetoxy-etio-allo-choladienic acid methyl ester which melts at 148.5–150° C.

Example 2

6.5 parts by weight of $\Delta^{14,16}$-3β-acetoxy-20-keto-allo-pregnadiene of the formula

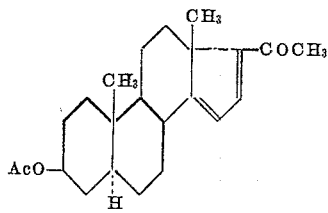

dissolved in 20 parts by volume of chloroform, are reacted with a solution of 4.4 parts by weight of monoperphthalic acid in 63.5 parts by volume of ether and stored 2 days at room temperature in darkness. Following this, the solution is filtered through a column of 80 parts by weight of aluminum oxide and the column washed well with a mixture of ether and benzol. On evaporation of the solvent, the filtrate leaves behind a solidified residue which after recrystallization from chloroform-ethanol yields $\Delta^{16}$-3β-acetoxy-14,15-oxido-20-keto-allo-pregnene in the form of thick plates of melting point 193–195° C.

$\Delta^{16}$ - 3β - acetoxy - 14,15 - oxido - 20 - keto-allo-pregnene may be hydrogenated as follows:

1 part by weight of $\Delta^{16}$-3β-acetoxy-14,15-oxido-20-keto-allo-pregnene of the formula

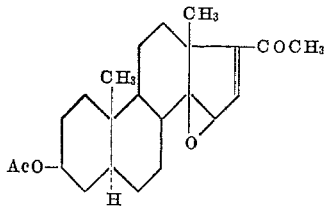

is shaken under hydrogen in 150 parts by volume of alcohol with 0.03 part by weight of previously reduced platinum oxide. The hydrogenation comes to a stop after 205 parts by volume of hydrogen (about 3 mols) are absorbed. It is filtered from the catalyst, the filtrate evaporated to dryness, the residue dissolved in 4 parts by volume of glacial acetic acid and reacted with a solution of 0.2 part by weight of chromium trioxide in 4 parts by volume of glacial acetic acid and kept 20 hours at 20° C. After the addition of a little methanol, it is poured into water, taken up in ether, the ether solution washed with water and sodium bicarbonate solution, dried over sodium sulfate and evaporated to dryness. The residue is purified chromatographically, whereby in addition to 3β-acetoxy-20-keto-17-iso-5,14-diallo-pregnane of melting point 104–106° C., there is isolated 3β-acetoxy-14 - hydroxy - 17 - iso - 20 - keto - allo - pregnane of melting point 165–166° C. of the formula

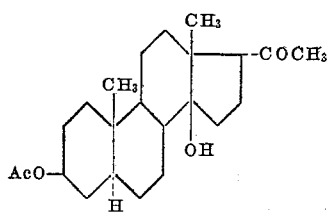

The $\Delta^{14,16}$ - 3β - acetoxy - 20 - keto - allo-pregnadiene may be obtained in the following manner:

While being exposed to light, 11 parts by weight of $\Delta^{16}$-3β-acetoxy-20-keto-allo-pregnene in 100 parts by volume of carbon tetrachloride are boiled 15 minutes under reflux with 6.1 parts by weight of bromosuccinimide. After cooling, it is filtered, the solvent evaporated in vacuo from the filtrate, and the residue in 150 parts by volume of pyridine boiled 5 hours under reflux, 40 parts by volume of acetic anhydride being added in the last ten minutes. After evaporation of the pyridine and acetic anhydride in vacuo, the residue is taken up in ether, the ether solution washed with 2-normal sulfuric acid, sodium bicarbonate solution and water, dried with sodium sulfate, decolorized with charcoal and the ether evaporated. The solidified residue yields after recrystallization from chloroform-ethanol $\Delta^{14,16}$-3β-acetoxy-20-keto-allo-pregnadiene of melting point 170–171° C.

The series of reactions described in this example may be carried out in analogous manner with $\Delta^{16}$ - 3β - hydroxy - 20 - keto - allo - pregnane which is not acylated in 3-position and which melts at 202–204° C., as starting material.

Example 3

$\Delta^{14,16}$ - 3β,21 - diacetoxy - 20 - keto - allo-pregnadiene of the formula

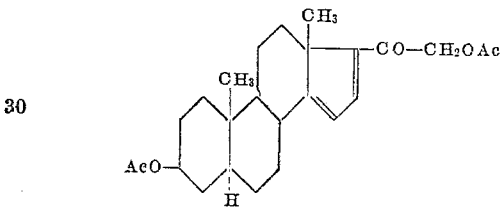

is dissolved in chloroform and mixed with a solution of monoperphthalic acid in ether. After a reaction period of 48 hours the solution is filtered through aluminum oxide and the filtrate evaporated to dryness. The residue is recrystallized from ethanol and yields $\Delta^{16}$-3β,21-diacetoxy-14,15-oxido-20-keto-allo-pregnene in the form of coarse needles melting at 154–155° C.

The $\Delta^{14,16}$ - 3β,21 - diacetoxy - 20 - keto - allo-pregnadiene may be prepared in the following manner:

3β,21 - diacetoxy - 20 - keto - allo - pregnane, dissolved in a mixture of carbon tetrachloride and glacial acetic acid is caused to react with 2 equivalent weights of bromine with the addition of anhydrous aluminum chloride. From the resultant 3β,21-diacetoxy-17-bromo-20-keto-allo-pregnane of melting point 144–145° C., hydrogen bromide is split off by boiling with pyridine. The homogeneous reaction product is $\Delta^{16}$-3β,21-diacetoxy-20-keto-allo-pregnene which melts at 126–127° C. By causing this compound to react with bromosuccinimide in carbon tetrachloride with exposure to light and subsequent treatment of the reaction product with boiling pyridine, $\Delta^{14,16}$ - 3β,21 - diacetoxy - 20 -keto-allo-pregnadiene, melting at 117–118° C., is obtained.

Example 4

1 part by weight of $\Delta^{14,16}$-3β-acetoxy-etio-allo-choladienic acid nitrile of melting point 143–145° C. and having the formula

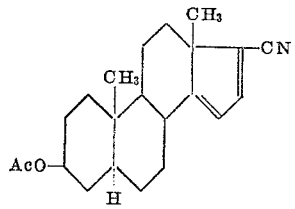

dissolved in 7 parts by volume of chloroform is mixed with a solution of 0.48 part by weight of perbenzoic acid in 10 parts by volume of chloroform and allowed to stand for 12 hours at room temperature. The solution is then filtered through aluminum oxide and the column well washed with ether. After removing the solvent by distillation, there remains 1 part by weight of crude $\Delta^{16}$-3$\beta$-acetoxy-14,15-oxido-etio-allocholenic acid nitrile of the formula

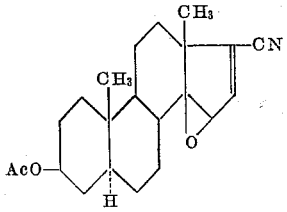

The above used starting material, the $\Delta^{14,16}$-3$\beta$-acetoxy-etio-allo-choladienic acid nitrile can be prepared as follows:

5 parts by weight of $\Delta^{16}$-3$\beta$-acetoxy-etio-allocholenic acid-nitrile, or the corresponding benzoate of melting point 159–161° C. are dissolved in 40 parts by volume of carbon tetrachloride and boiled with 3.45 parts by weight of bromosuccinimide in a reflux apparatus for 15 minutes. The resultant succinimide is removed by filtration, the solvent is eliminated under reduced pressure and the glassy residue boiled for 2½ hours with 30 parts by volume of pyridine under reflux and 2 parts by volume of acetic anhydride are added 2 hours later. The solution is poured into cooled hydrochloric acid, extracted with ether and the ethereal solution washed with sodium bicarbonate solution and water until neutral. The crude product obtained after drying and removal of the ether by distillation yields, when crystallized once from methanol, 3.5 parts by weight of $\Delta^{14,16}$-3$\beta$-acetoxy-etio-allo-choladienic acid nitrile of melting point 143–145° C.

*Example 5*

$\Delta^{5,16}$-3$\beta$-acetoxy-etio-choladienic acid methyl ester of melting point 163–164° C. is dissolved in ether and the quantity of bromine in acetic acid calculated to saturate one double linkage is added dropwise. After the usual processing the crude 5,6-dibromide is caused to react with bromosuccinimide in carbon tetrachloride, while being exposed to light, in which operation the bromine atom, just introduced into the 15-position, is split off in the form of hydrogen bromide by prolonged boiling in the same solvent. The resultant $\Delta^{14,16}$-3$\beta$-acetoxy-5,6-dibromo-etio-choladienic acid-methyl ester is freed from bromine by means of zinc dust in glacial acetic acid.

The resultant $\Delta^{5,14,16}$-3$\beta$-acetoxy-etio-cholatrienic acid-methyl ester is dissolved in chloroform and mixed with the quantity of perbenzoic acid in chloroform calculated to oxidize one double linkage and the mixture is allowed to stand for 24 hours at —10° C. The reaction product is filtered through aluminum oxide and the $\Delta^{5,16}$-3$\beta$-acetoxy-14,15-oxido-etio-choladienic acid-methyl ester, which is obtained as the main product of the reaction, is hydrogenated in rectified alcohol with the use of Raney nickel as catalyst because platinum oxide would also affect the 5,6-double linkage. After chromatographic purification of the hydrogenation product, a mixture of the 17-isomeric $\Delta^{5}$-3$\beta$-acetoxy-14-hydroxy-etio-cholenic acid-methyl esters is obtained.

Having thus disclosed the invention, what is claimed is:

1. $\Delta^{16}$ - 14,15 - oxido - cyclopentanopolyhydrophenanthrenes containing in 17-position a member selected from the group consisting of free carboxyl, carboxyl esterified with a lower alkanol, free hydroxyacetyl, hydroxyacetyl esterified with a lower alkanoic acid, acetyl and cyano.

2. $\Delta^{16}$-3 - lower alkanoyloxy-14,15-oxido-etio-allo-cholenic acids esterified with a lower alcohol.

3. $\Delta^{16}$-3-lower alkanoyloxy - 14,15 - oxido - 20-keto-allo-pregnenes.

4. $\Delta^{16}$-3,21-lower dialkanoyloxy - 14,15 - oxido-20-keto-allo-pregnenes.

5. $\Delta^{16}$-3$\beta$-acetoxy-14,15-oxido-etio-allo - cholenic acid methyl ester of the formula

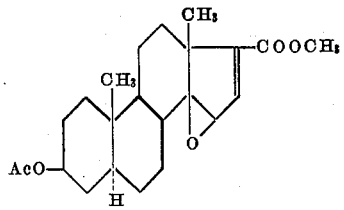

6. $\Delta^{16}$ - 3$\beta$ - acetoxy - 14,15-oxido-20-keto-allo-pregnene of the formula

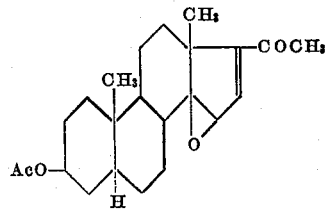

7. $\Delta^{16}$ - 3$\beta$,21 - diacetoxy - 14,15-oxido-20-keto-allo-pregnene of the formula

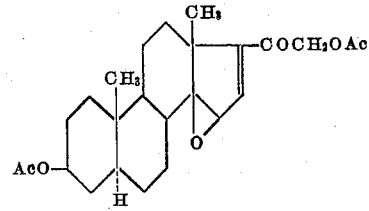

LEOPOLD RUZICKA.
PLACIDUS PLATTNER.

No references cited.